(12) United States Patent
Hazbun et al.

(10) Patent No.: US 12,521,714 B2
(45) Date of Patent: Jan. 13, 2026

(54) MICROFLUIDIC CHANNELS IN A SUBSTRATE WITH A SURFACE COVERED BY A LAYER STACK

(71) Applicant: GlobalFoundries U.S. Inc., Malta, NY (US)

(72) Inventors: Ramsey Hazbun, Colchester, VT (US); Siva P. Adusumilli, South Burlington, VT (US); Mark Levy, Williston, VT (US); Bartlomiej Jan Pawlak, Leuven (BE)

(73) Assignee: GlobalFoundries U.S. Inc., Malta, NY (US)

( * ) Notice: Subject to any disclaimer, the term of this patent is extended or adjusted under 35 U.S.C. 154(b) by 835 days.

(21) Appl. No.: 17/858,461

(22) Filed: Jul. 6, 2022

(65) Prior Publication Data

US 2024/0009668 A1    Jan. 11, 2024

(51) Int. Cl.
*B01L 3/00* (2006.01)
*B81B 1/00* (2006.01)
*B81C 1/00* (2006.01)

(52) U.S. Cl.
CPC .......... *B01L 3/50273* (2013.01); *B81B 1/002* (2013.01); *B81C 1/00071* (2013.01); *B01L 2300/0645* (2013.01); *B01L 2300/12* (2013.01); *B01L 2400/0424* (2013.01); *B81B 2201/05* (2013.01); *B81B 2203/0338* (2013.01)

(58) Field of Classification Search
CPC ........ B01L 3/50273; B01L 2300/0645; B01L 2300/12; B01L 2400/0424; B01L 2300/0887; B01L 2300/16; B01L 3/502707; B81B 1/002; B81B 2201/05; B81B 2203/0338; B81B 2201/058; B81C 1/00071; B81C 2203/0172; B81C 2203/0728; B81C 1/00119; B81C 2203/0714

See application file for complete search history.

(56) References Cited

U.S. PATENT DOCUMENTS

| | | |
|---|---|---|
| 6,992,367 B2 | 1/2006 | Erratico et al. |
| 8,106,436 B2 | 1/2012 | Grivna et al. |
| 10,446,643 B2 | 10/2019 | Adusumilli et al. |

(Continued)

OTHER PUBLICATIONS

M. J. de Boer et al., "Micromachining of buried micro channels in silicon," in Journal of Microelectromechanical Systems, vol. 9, No. 1, pp. 94-103, doi: 10.1109/84.825783 (Mar. 2000).

(Continued)

*Primary Examiner* — Brian J. Sines
(74) *Attorney, Agent, or Firm* — Thompson Hine LLP; Francois Pagette

(57) ABSTRACT

Structures for a microfluidic channel and methods of forming a structure for a microfluidic channel. The structure comprises a semiconductor substrate including a trench and a layer stack on the semiconductor substrate. The layer stack includes a first layer, a second layer between the first layer and the semiconductor substrate, and an opening penetrating through the first layer and the second layer to the trench. The structure further comprises a third layer inside the opening in the layer stack. The third layer, which comprises a semiconductor material, obstructs the opening to define a cavity inside the trench.

20 Claims, 6 Drawing Sheets

(56) References Cited

U.S. PATENT DOCUMENTS

| | | | |
|---|---|---|---|
| 2007/0238233 A1* | 10/2007 | Sadaka | H10D 84/0188 |
| | | | 257/E21.628 |
| 2017/0238233 A1* | 8/2017 | Oh | H04W 74/0808 |
| | | | 370/328 |
| 2021/0125859 A1* | 4/2021 | Lin | H10D 84/0158 |

OTHER PUBLICATIONS

Yu, Q. et al., "Fabrication Method of Microfluidic Channels with Circular Cross Section for Micro-Coriolis Mass Flow Sensor," The 4th Conference on MicroFluidic Handling Systems; pp. 103-105 (Oct. 2-4, 2019).

Howe, R.T. "Recent Advances in Surface Micromachining," T. IEE Japan, vol. 116-E, No. 3, pp. 90-97 (1996).

\* cited by examiner

MICROFLUIDIC CHANNELS IN A SUBSTRATE WITH A SURFACE COVERED BY A LAYER STACK

BACKGROUND

This disclosure relates generally to semiconductor devices and integrated circuit fabrication and, in particular, to structures for a microfluidic channel and methods of forming a structure for a microfluidic channel.

Microfluidic systems may rely on microfluidic channels to control and to manipulate the flow of small fluidic volume on a chip. For example, microfluidic channels can supply fluid passages in a microfluidic system in order to perform on-chip biological analysis, or can be used as fluid passages to supply fluid flow for chip cooling.

Improved structures for a microfluidic channel and methods of forming a structure for a microfluidic channel are needed.

SUMMARY

In an embodiment of the invention, a structure comprises a semiconductor substrate including a trench and a layer stack on the semiconductor substrate. The layer stack includes a first layer, a second layer between the first layer and the semiconductor substrate, and an opening penetrating through the first layer and the second layer to the trench. The structure further comprises a third layer inside the opening in the layer stack. The third layer, which comprises a semiconductor material, obstructs the opening to define a cavity inside the trench.

In an embodiment of the invention, a method comprises forming a trench in a semiconductor substrate and forming a layer stack on the semiconductor substrate. The layer stack includes a first layer, a second layer between the first layer and the semiconductor substrate, and an opening penetrating through the first layer and the second layer to the trench. The method further comprises forming a third layer inside the opening in the layer stack. The third layer, which comprises a semiconductor material, obstructs the opening to define a cavity inside the trench.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
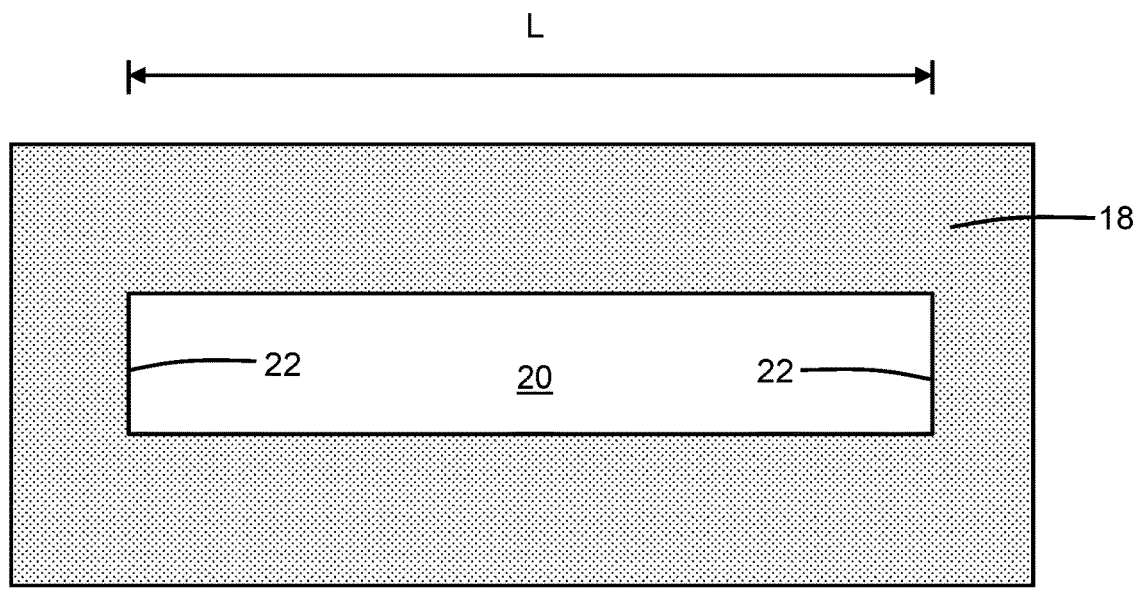
FIG. 1 is a top view of a structure at an initial fabrication stage of a processing method in accordance with embodiments of the invention.
Figure 2:
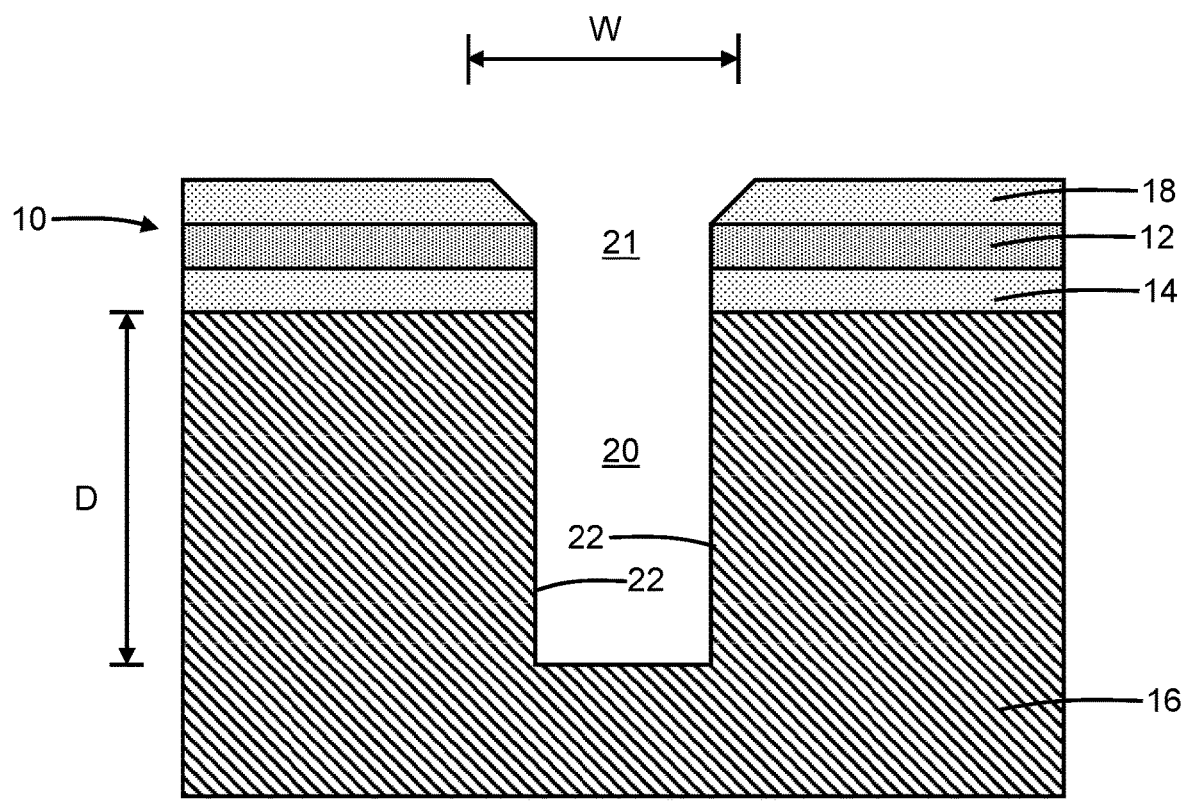
FIG. 2 is a cross-sectional view taken generally along line 2-2 in FIG. 1.

With reference to FIGS. 1, 2 and in accordance with embodiments of the invention, a layer stack 10 includes a layer 12, a dielectric layer 14, and a semiconductor substrate 16. The layer 12 is positioned on the dielectric layer 14, and the dielectric layer 14 is positioned on the semiconductor substrate 16. The layer 12 is separated from the semiconductor substrate 16 by the intervening dielectric layer 14. The layer 12 may be comprised of a single-crystal semiconductor material, such as single-crystal silicon, and may be intrinsic or lightly doped p-type. The dielectric layer 14 may be comprised of a dielectric material, such as silicon dioxide, that is an electrical insulator. The semiconductor substrate 16 may be comprised of a semiconductor material, such as single-crystal silicon, and may be lightly doped p-type. The dielectric layer 14 has an upper interface with the layer 12, the dielectric layer 14 has a lower interface with the semiconductor substrate 16, and the upper and lower interfaces are separated by the thickness of the dielectric layer 14. In an embodiment, the layer 12, dielectric layer 14, and semiconductor substrate 16 may be integrated into a silicon-on-insulator (SOI) substrate. A dielectric layer 18 is positioned on the layer 12 of the layer stack 10. The dielectric layer 18 may be comprised of a dielectric material, such as silicon dioxide.

In an alternative embodiment, the layer 12 may be comprised of amorphous silicon. In an alternative embodiment, the layer 12 may be comprised of silicon nitride. In an alternative embodiment, the layer 12 may be comprised of silicon nitride, and the dielectric layer 14 may be omitted such that the layer 12 directly contacts the semiconductor substrate 16.

The layer stack 10 is patterned by lithography and etching processes to define an opening 21 that is fully surrounded by the layer stack 10. In an embodiment, the opening 21 may be fully surrounded by a surface of the layer 12, a surface of the dielectric layer 14, and a surface of the dielectric layer 18. The opening 21 penetrates fully through the layer 12, the dielectric layer 14 and the dielectric layer 18 to the semiconductor substrate 16.

A trench 20 is formed that extends into the semiconductor substrate 16 by an etching process at the location of the opening 21. In an embodiment, the etching process may be an anisotropic etching process such that the trench 20 has sidewalls 22 that are oriented in a vertical or substantially vertical direction. The trench 20 has a base at a depth D, which may be determined by the etching process. The trench 20 has a width W, which may be determined by the lithography process, between the opposite sidewalls 22. The trench 20 may be elongated with a length L that is greater than its width W, which may enable eventual use of the trench 20 as a microfluidic channel.

Figure 3:
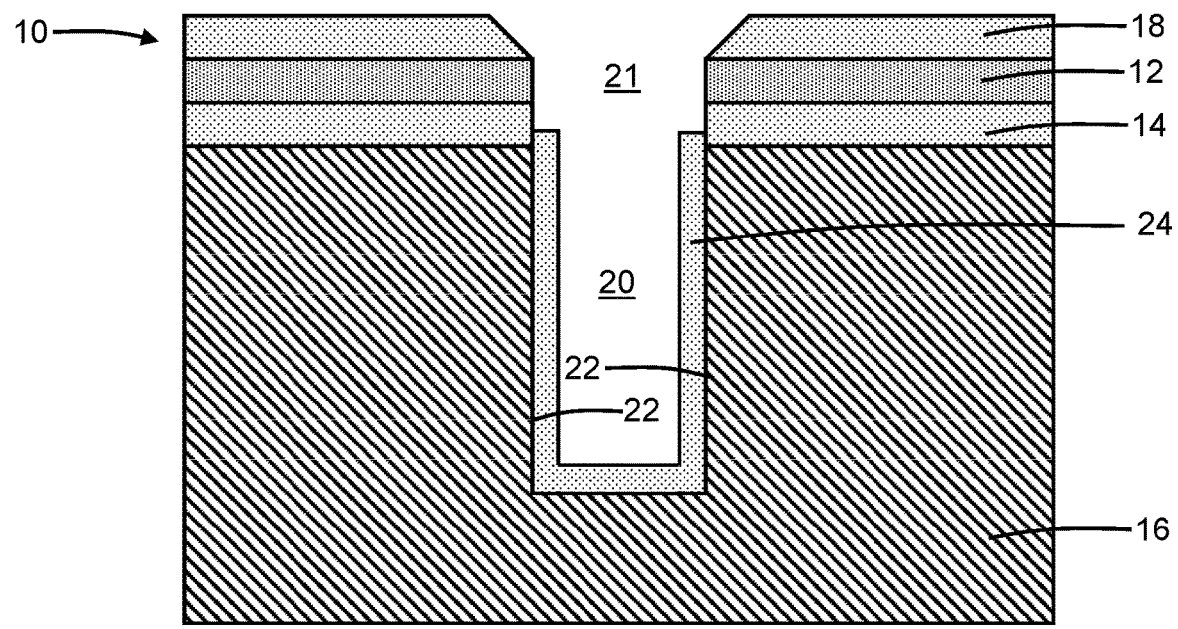
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 24 may be formed as a liner that coats or lines the sidewalls 22 of the trench 20. The dielectric layer 24 may be comprised of a dielectric material, such as silicon dioxide. The dielectric layer 24 is positioned on the surfaces of the semiconductor substrate 16 at the sidewalls 22 and base of the trench 20. Following deposition, the dielectric layer 24 may be recessed by an etching process to expose the surfaces of the layer 12 bordering the opening 21. The dielectric layer 24 extends in a vertical direction to the layer stack 10 and may overlap slightly with the dielectric layer 14.

Figure 4:
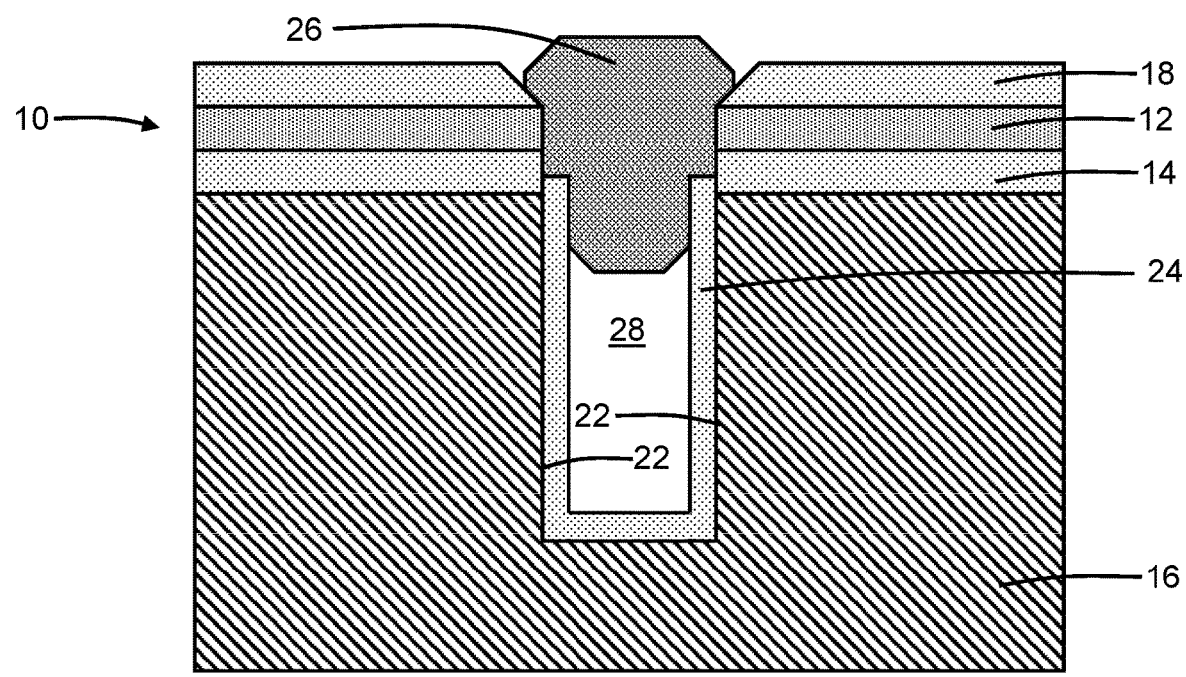
FIG. 4 is a cross-sectional view of the structure at a fabrication stage subsequent to FIG. 3.

With reference to FIG. 4 in which like reference numerals refer to like features in FIG. 3 and at a subsequent fabrication stage, a semiconductor layer 26 may be formed that is positioned inside the opening 21. The semiconductor layer 26 pinches off the opening 21 (FIG. 3), when formed, such that the trench 20 is obstructed or blocked. A cavity 28 is defined as an unfilled portion of the trench 20 that is not occupied by the dielectric layer 24 or the semiconductor layer 26. The dielectric layer 24 and the semiconductor layer 26 collectively surround the cavity 28. The semiconductor layer 26 closing the cavity 28 may have a thickness that is equal to the width W of the opening 21. A lower portion of the semiconductor layer 26 may project in a vertical direction into an upper portion of the trench 20, and an upper portion of the semiconductor layer 26 may project in a vertical direction inside the opening 21 above the level of the layer 12.

The semiconductor layer 26 may be formed by an epitaxial growth process. The semiconductor layer 26 may be in direct contact with the surfaces of the layer 12 surrounding the opening 21. In an embodiment, the semiconductor layer 26 may be comprised of a semiconductor material that is epitaxially grown from the exposed surfaces of the layer 12 surrounding the opening 21. The surfaces of the layer 12 surrounding the opening 21 operate as a growth seed for nucleating lateral and vertical growth of the semiconductor material. In an embodiment, the semiconductor layer 26 may be comprised of silicon, germanium, or a combination of these materials. In an embodiment, the semiconductor layer 26 may be comprised of a single-crystal semiconductor material, such as single-crystal silicon-germanium, single-crystal silicon, or single-crystal germanium. In an alternative embodiment, the semiconductor layer 26 may be comprised of a polycrystalline semiconductor material, such as polycrystalline silicon-germanium, polycrystalline silicon, or polycrystalline germanium. In an alternative embodiment, the semiconductor layer 26 may be comprised of an amorphous semiconductor material, such as amorphous silicon-germanium, amorphous silicon, or amorphous germanium. The dielectric layer 24 prevents epitaxial growth from the surfaces of the semiconductor substrate 16 surrounding the sidewalls 22 and base of the trench 20. The dielectric layer 18 prevents epitaxial growth from the top surface of the layer 12. In an embodiment, the semiconductor layer 26 and the layer 12 may be planarized by chemical-mechanical polishing, which may remove the dielectric layer 18.

The cavity 28 may define a microfluidic channel for use as a fluid passage. The formation of the microfluidic channel may be simplified in comparison with conventional methods of forming a microfluidic channel.

Figure 5:
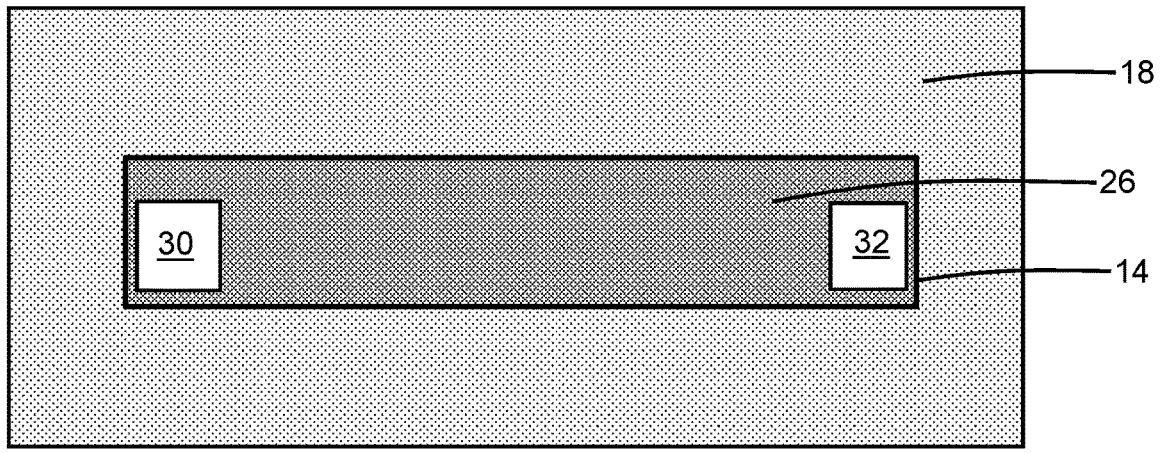
FIG. 5 is a top view of a structure in accordance with alternative embodiments.

With reference to FIG. 5 and in accordance with alternative embodiments, the cavity 28 may have an inlet 30 and an outlet 32 that each penetrate through the semiconductor layer 26 to the cavity 28. The inlet 30 and outlet 32 may be formed by patterning openings by lithography and etching processes that penetrate through the semiconductor layer 26. Portions of the semiconductor layer 26 may surround the inlet 30 and the outlet 32.

Figure 6:
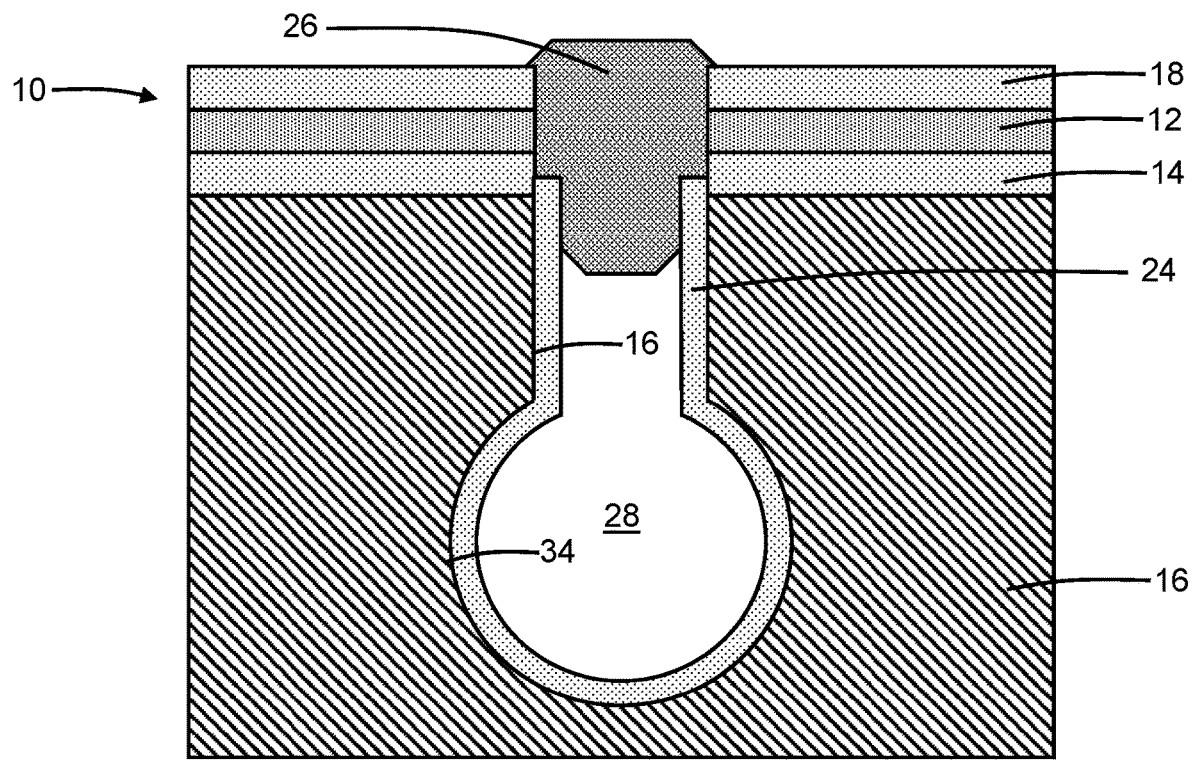
FIG. 6 is a cross-sectional view of a structure in accordance with alternative embodiments.

With reference to FIG. 6 and in accordance with alternative embodiments, the trench 20 may be formed with portions of different geometrical shape by, for example, performing one or more isotropic etching processes. For example, following an initial anisotropic etching process partially forming the trench 20, the trench 20 may be subsequently etched by an isotropic etching process to produce a lower portion in the semiconductor substrate 16 that is cylindrical with a curved sidewall 34. An upper portion of the trench 20 may retain the geometrical shape (e.g., rectangular shape) existing after the initial anisotropic etching process and before the isotropic etching process completing the formation of the trench 20. In an alternative embodiment, the etching process may be adjusted such that the lower portion of the trench 20 has a faceted geometrical shape instead of a cylindrical geometrical shape. The cavity 28, when the trench 20 is sealed by the semiconductor layer 26, may adopt the shape of the trench 20.

Figure 7:
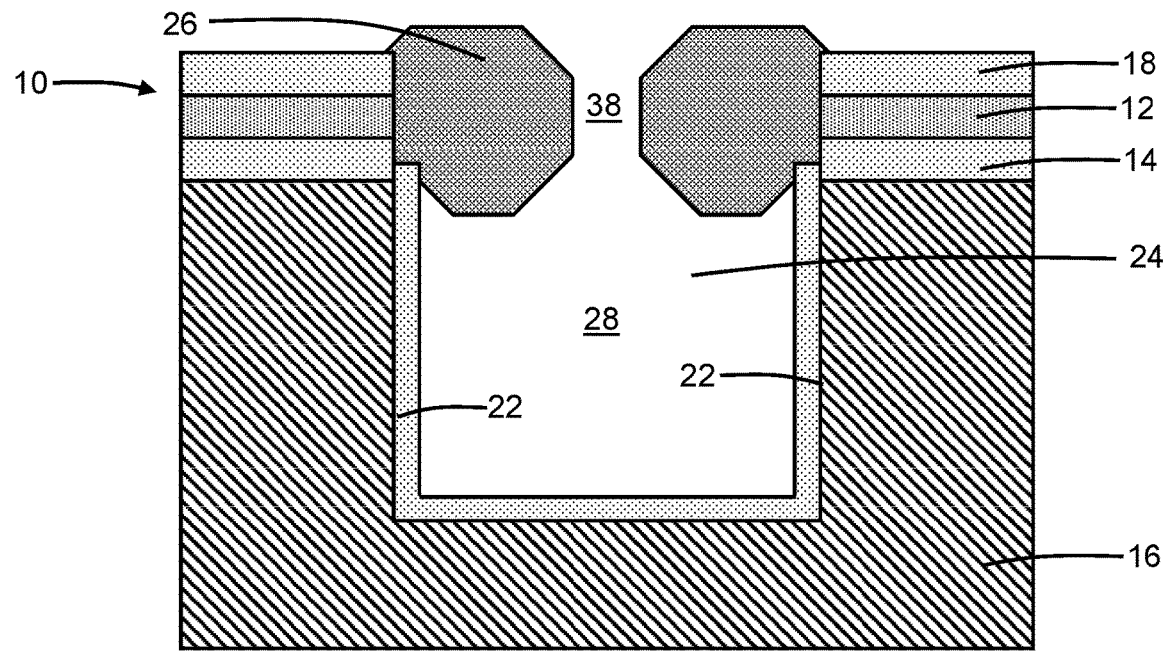
FIG. 7 is a cross-sectional view of a structure in accordance with alternative embodiments.

With reference to FIG. 7 and in accordance with alternative embodiments, the trench 20 may include a portion that is wider than other portions of the trench 20. As a result, a portion of the opening 21 may remain unclosed between the opposing sections of the semiconductor layer 26 and may be in fluid communication with the cavity 28.

Figure 8:
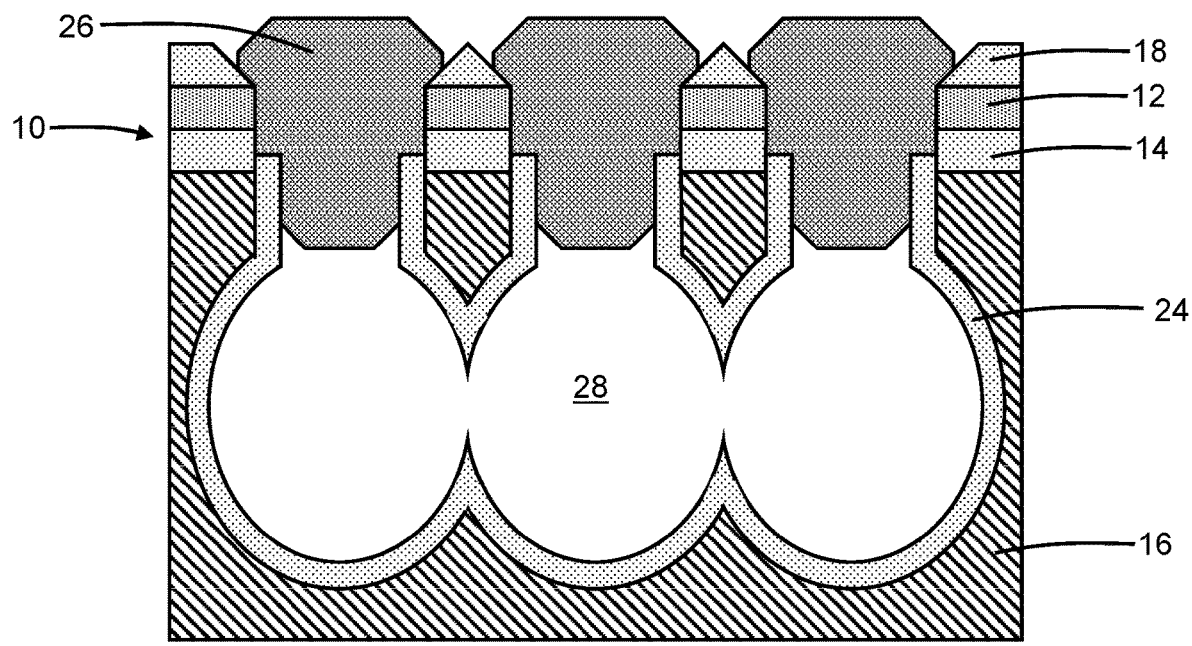
FIG. 8 is a cross-sectional view of a structure in accordance with alternative embodiments.

With reference to FIG. 8 and in accordance with alternative embodiments, the cavity 28 may include multiple chambers each of which may be formed using a distinct trench 20 and sealed by a distinct section of the semiconductor layer 26. Each trench 20 may be etched by an isotropic etching process such that the different chambers of the cavity 28 merge and become adjoined with each other. Each chamber of the cavity 28 may include a cylindrical lower section or, in an alternative embodiment, may include a faceted lower section. The multiple-chamber cavity 28 may be effective to increase the cross-sectional area of the fluid channel.

Figure 9:
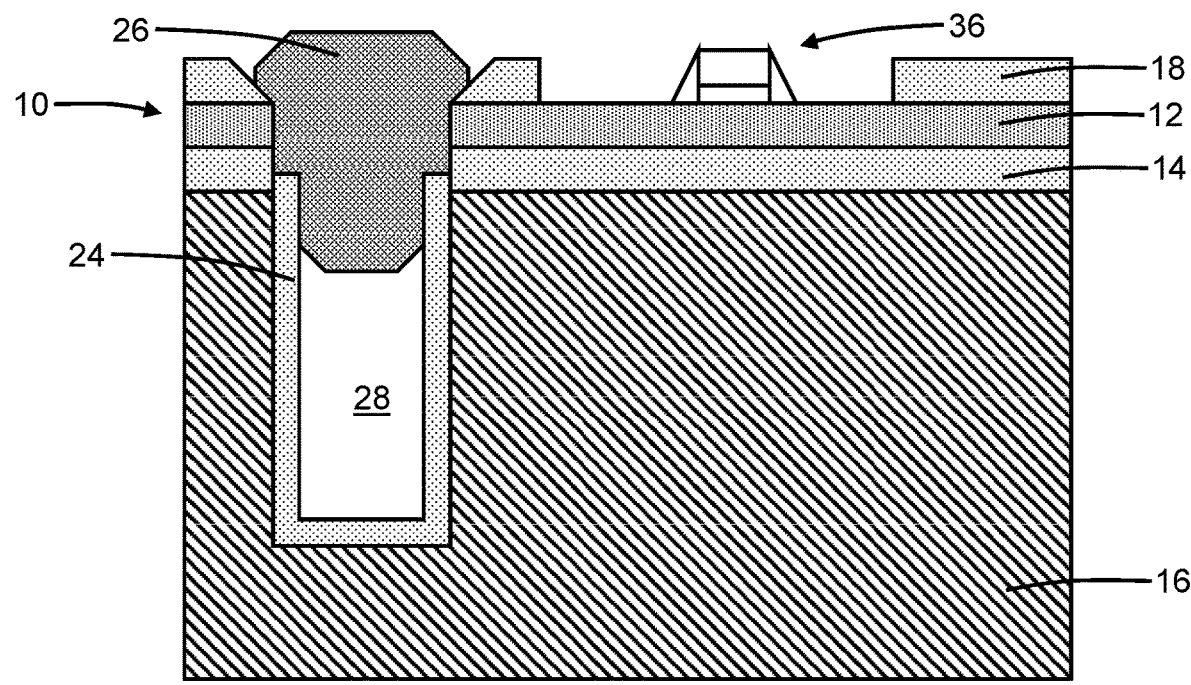
FIG. 9 is a cross-sectional view of a structure in accordance with alternative embodiments.

With reference to FIG. 9 and in accordance with alternative embodiments, a transistor 36 may be formed using the layer 12 at a location adjacent to the cavity 28. The transistor 36, which is a planar field-effect transistor in the representative embodiment that includes a gate electrode above the layer 12 and a gate dielectric layer disposed between the gate electrode and the layer 12, as well as a source and a drain in the layer 12.

Figure 10:
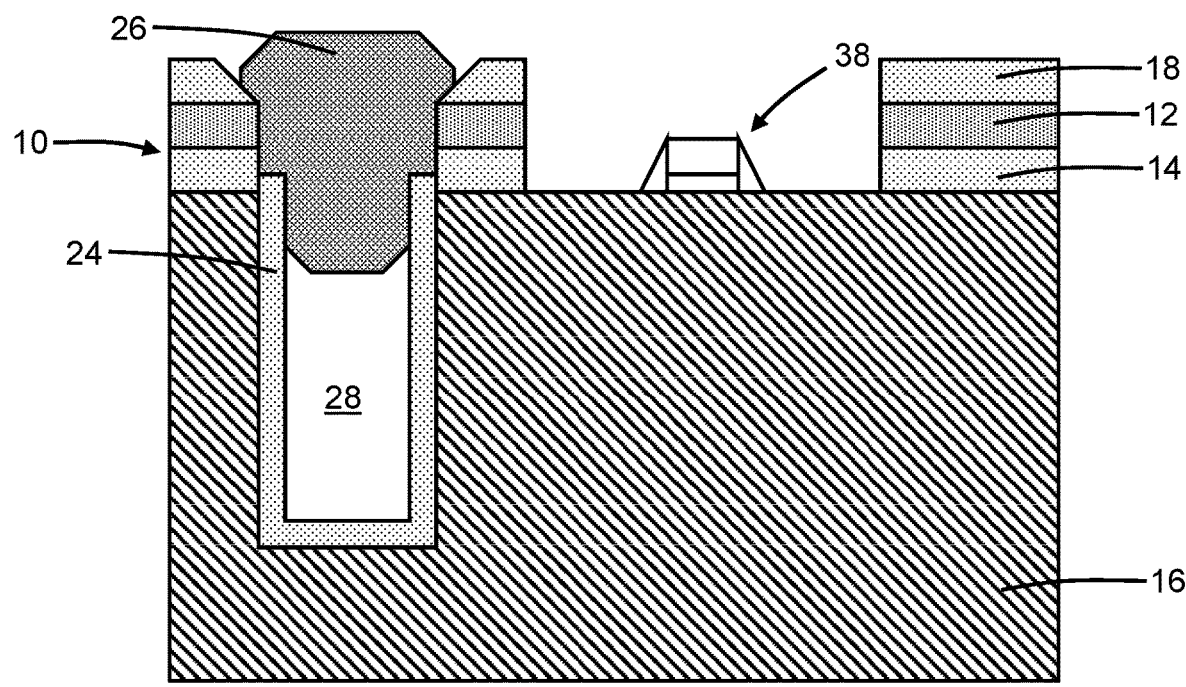
FIG. 10 is a cross-sectional view of a structure in accordance with alternative embodiments.

With reference to FIG. 10 and in accordance with alternative embodiments, a transistor 38 may be formed using the semiconductor substrate 16 at a location adjacent to the cavity 28. The transistor 38, which is a planar field-effect transistor in the representative embodiment, that includes a gate electrode above the semiconductor substrate 16 and a gate dielectric layer disposed between the gate electrode and the semiconductor substrate 16, as well as a source and a drain in the semiconductor substrate 16. The layer 12 and the dielectric layer 14 may be locally removed to expose the semiconductor substrate 16 and permit the formation of the transistor 38.

Figure 11:
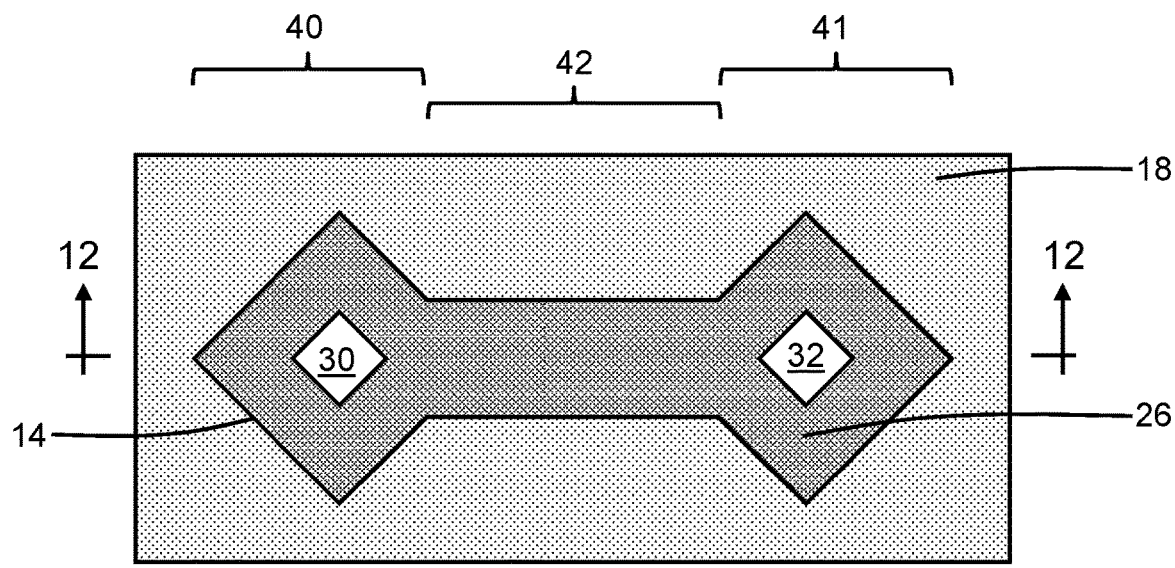
FIG. 11 is a top view of a structure in accordance with alternative embodiments.
Figure 12:
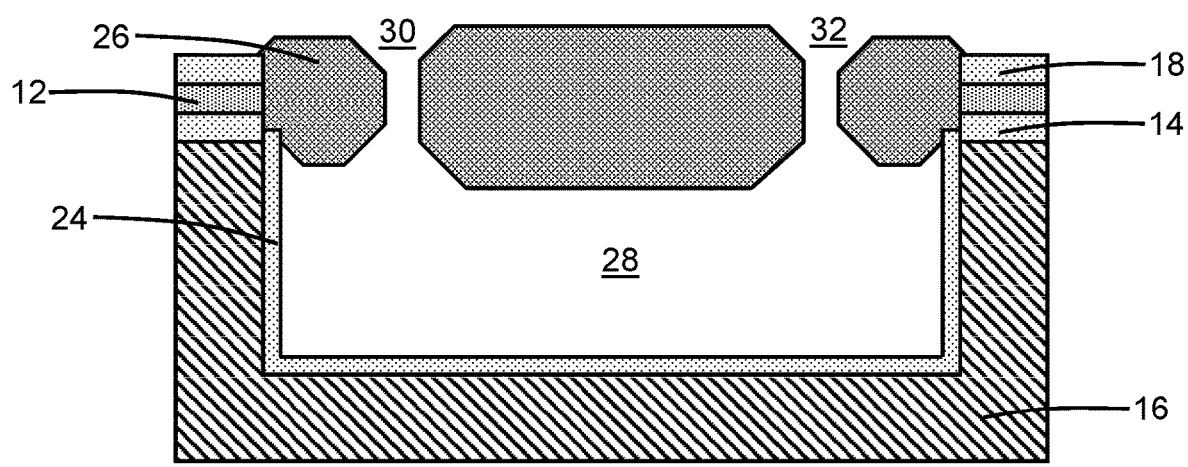
FIG. 12 is a cross-sectional view taken generally along line 12-12 in FIG. 11.

With reference to FIGS. 11, 12 and in accordance with alternative embodiments, the trench 20 and opening 21 may have a shape, in plan view, that includes opposite end portions 40, 41 and a central portion 42 positioned along the length of the trench 20 (i.e., longitudinally) between the end portion 40 and the end portion 41. When the semiconductor layer 26 is epitaxially grown, the semiconductor layer 26 closes the opening 21 over the central portion 42 and only partially closes the end portions 40, 41 of the opening 21.

The inlet 30 and outlet 32 to the cavity 28 are thereby defined in the end portions 40, 41 without the necessity of patterning the semiconductor layer 26. Portions of the semiconductor layer 26 respectively surround the inlet 30 and the outlet 32.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a semiconductor substrate including a trench;
   a layer stack on the semiconductor substrate, the layer stack including a first layer, a second layer between the first layer and the semiconductor substrate, and an opening penetrating through the first layer and the second layer to the trench, and the first layer including a surface surrounding the opening; and
   a third layer inside the opening in the layer stack, the third layer comprising a semiconductor material, the third layer is in direct contact with the surface of the first layer, and the third layer occluding the opening to define a cavity inside the trench.

2. A structure comprising:
   a semiconductor substrate including a trench;
   a layer stack on the semiconductor substrate, the layer stack including a first layer, a second layer between the first layer and the semiconductor substrate, and an opening penetrating through the first layer and the second layer to the trench; and
   a third layer inside the opening in the layer stack, the third layer comprising a semiconductor material, and the third layer occluding the opening to define a cavity inside the trench,
   wherein the cavity has an inlet and an outlet, and the inlet and the outlet are each surrounded by a portion of the third layer.

3. The structure of claim 1 wherein the trench includes a plurality of sidewalls in the semiconductor substrate, and further comprising:
   a fourth layer on the plurality of sidewalls of the trench, the fourth layer comprising a dielectric material, and the fourth layer extending in a vertical direction to the layer stack.

4. The structure of claim 1 wherein the semiconductor material of the third layer comprises silicon or silicon-germanium.

5. The structure of claim 1 wherein the first layer comprises a single-crystal semiconductor material.

6. The structure of claim 1 wherein the first layer comprises an amorphous semiconductor material.

7. The structure of claim 1 wherein the first layer comprises silicon nitride.

8. The structure of claim 1 wherein the layer stack fully surrounds the opening.

9. The structure of claim 1 wherein the cavity includes a plurality of chambers.

10. The structure of claim 1 wherein the layer stack includes a fourth layer on the first layer, the opening penetrates through the fourth layer, and the fourth layer comprises a dielectric material.

11. The structure of claim 1 wherein the third layer extends in a vertical direction into a portion of the trench.

12. The structure of claim 1 further comprising:
    a field-effect transistor adjacent to the trench, the field-effect transistor including a gate positioned above the semiconductor substrate or above the first layer.

13. The structure of claim 1 wherein the trench includes a first portion with a first geometrical shape and a second portion with a second geometrical shape that is different from the first geometrical shape.

14. The structure of claim 13 wherein the second geometrical shape is cylindrical.

15. The structure of claim 2 wherein the opening and the trench have a first end portion, a second end portion, and a central portion longitudinally between the first end portion and the second end portion, and the inlet is in the first end portion and the outlet is in the second end portion.

16. The structure of claim 2 wherein the first layer includes a surface surrounding the opening, and the third layer is in direct contact with the surface of the first layer.

17. The structure of claim 2 wherein the first layer comprises a single-crystal semiconductor material, an amorphous semiconductor material, or silicon nitride, and the semiconductor material of the third layer comprises silicon or silicon-germanium.

18. A method comprising:
   forming a trench in a semiconductor substrate;
   forming a layer stack on the semiconductor substrate, wherein the layer stack includes a first layer, a second layer between the first layer and the semiconductor substrate, and an opening penetrating through the first layer and the second layer to the trench; and
   forming a third layer inside the opening in the layer stack, wherein the third layer comprises a semiconductor material, and the third layer obstructs the opening to define a cavity inside the trench,
   wherein the first layer includes a surface surrounding the opening, and the third layer is in direct contact with the surface of the first layer.

19. The method of claim 18 wherein the third layer is formed by an epitaxial growth process nucleated by the first layer bordering the opening.

20. The method of claim 18 further comprising:
   forming an inlet and an outlet to the cavity.

* * * * *